United States Patent
Nakahata et al.

(10) Patent No.: US 11,405,282 B2
(45) Date of Patent: Aug. 2, 2022

(54) DEVICE MANAGEMENT SYSTEM, NETWORK DEVICE, DEVICE MANAGEMENT METHOD, AND COMPUTER-READABLE MEDIUM

(71) Applicant: BUFFALO INC., Aichi (JP)

(72) Inventors: Atsuo Nakahata, Aichi (JP); Junji Inoue, Aichi (JP); Osamu Yamada, Aichi (JP)

(73) Assignee: BUFFALO INC., Aichi (JP)

( * ) Notice: Subject to any disclaimer, the term of this patent is extended or adjusted under 35 U.S.C. 154(b) by 57 days.

(21) Appl. No.: 16/750,003

(22) Filed: Jan. 23, 2020

(65) Prior Publication Data
US 2020/0244538 A1 Jul. 30, 2020

(30) Foreign Application Priority Data
Jan. 30, 2019 (JP) .............................. JP2019-014849

(51) Int. Cl.
*G06F 15/173* (2006.01)
*H04L 41/12* (2022.01)
*H04L 41/0893* (2022.01)

(52) U.S. Cl.
CPC .......... *H04L 41/12* (2013.01); *H04L 41/0893* (2013.01)

(58) Field of Classification Search
CPC .............................. H04L 41/12; H04L 41/0893
See application file for complete search history.

(56) References Cited

U.S. PATENT DOCUMENTS

| | | | | |
|---|---|---|---|---|
| 2005/0234941 | A1* | 10/2005 | Watanabe | G06F 3/0614 |
| 2007/0282995 | A1* | 12/2007 | Mizuno | G06F 3/1239 |
| | | | | 709/223 |
| 2011/0075204 | A1 | 3/2011 | Yoshimura | |
| 2012/0304189 | A1* | 11/2012 | Tominaga | G06F 3/067 |
| | | | | 718/104 |
| 2017/0201850 | A1* | 7/2017 | Raleigh | G06F 3/0482 |

FOREIGN PATENT DOCUMENTS

| | | |
|---|---|---|
| EP | 2690842 A1 | 1/2014 |
| JP | 2001-014123 A | 1/2001 |
| JP | 2008-015616 A | 1/2008 |
| JP | 2011-076308 A | 4/2011 |
| JP | 2014-041591 A | 3/2014 |

* cited by examiner

*Primary Examiner* — Wing F Chan
*Assistant Examiner* — Joseph R Maniwang
(74) *Attorney, Agent, or Firm* — Xsensus LLP

(57) ABSTRACT

A system includes a device management apparatus. The device management apparatus includes: one or more memories; and one or more processors. The one or more processors are configured to: store user group information that defines at least one user group, each user group being a group of one or more users; store device group definition information that defines at least one device group in association with at least one user group, each device group being a group of one or more network devices; store authority information of each device group associated with at least one user group; store association information that associates each of the network devices to be objects of management with at least one of the device groups; and determine whether to permit a user operation related to a network device belonging to a device group based on the authority information of each of the device groups.

21 Claims, 6 Drawing Sheets

DEVICE MANAGEMENT SYSTEM, NETWORK DEVICE, DEVICE MANAGEMENT METHOD, AND COMPUTER-READABLE MEDIUM

CROSS-REFERENCE TO RELATED APPLICATIONS

This application is based on and claims priority under 35 USC 119 from Japanese Patent Application No. 2019-014849 filed on Jan. 30, 2019, the contents of which are incorporated herein by reference.

TECHNICAL FIELD

The present invention relates to a device management apparatus, a network device, a device management system, a device management method, and a computer-readable medium.

BACKGROUND

In recent years, various kinds of devices (network devices) that can be connected through networks have been used in a lot of companies, as well as in homes, and managing them has become a burden. For this reason, the number of cases of asking business operators and others to manage network devices has been increasing.

Meanwhile, the manufacturers of network devices have been providing cloud type systems for managing network devices already registered through the Internet and the like to facilitate management of network devices.

Also, Japanese Patent Application Laid-Open No. 2011-76308 discloses a technology for registering a plurality of image forming devices as objects of management in response to operations from web browsers, repeatedly acquiring information such as the states of the registered devices, and storing the acquired information to monitor the devices.

However, according to the above-mentioned technology, in the case where business operators manage clients' network devices, if the number of clients who one business operator needs to manage is two or more, it is required to perform cloud setting for each client. For this reason, the burden of managing increases remarkably.

The present invention was made in view of the above-mentioned circumstances, and an object of the present invention is to provide a device management system, a network device, a device management method, and a computer-readable medium capable of supporting a management service corresponding to a plurality of clients and a plurality of network devices.

SUMMARY

A device management system related to the present invention includes a device management apparatus. The device management apparatus includes: one or more memories; and one or more processors. The one or more processors are configured to: store in the one or more memories user group information that defines at least one user group, each user group being a group of one or more users; store in the one or more memories device group definition information that defines at least one device group in association with at least one user group, each device group being a group of one or more network devices; store in the one or more memories authority information of each device group associated with at least one user group; store in the one or more memories association information that associates each of the network devices to be objects of management with at least one of the device groups; and determine whether to permit a user operation related to a network device belonging to a device group based on the authority information of each of the device groups stored in the one or more memories.

A device management method related to the present invention is executed by a computer system including at least one computer. The device management method includes: storing, by the computer system, user group information that defines at least one user group, each user group being a group of one or more users; storing, by the computer system, device group definition information that defines at least one device group in association with at least one user group, each device group being a group of one or more network devices; storing, by the computer system, authority information of each device group associated with at least one user group; storing, by the computer system, association information that associates each of the network devices to be objects of management with at least one of the device groups; determining, by the computer system, whether to permit a user's operation related to a network device belonging to a device group based on the authority information of each of the device groups stored by the computer system; determining, by the computer system, whether to permit a predetermined operation of a user when receiving from the user a request for the predetermined operation related to a network device belonging to any one of the device groups; and performing processing based on the request for the predetermined operation when the predetermined operation of the user is permitted.

A non-transitory, computer-readable medium related to the present invention stores instructions that, when executed by a computer system including a display screen and circuitry, control the computer system to implement a device management method. The device management method includes: storing, by the computer system, user group information that defines at least one user group, each user group being a group of one or more users; storing, by the computer system, device group definition information that defines at least one device group in association with at least one user group, each device group being a group of one or more network devices; storing, by the computer system, authority information of each device group associated with at least one user group; storing, by the computer system, association information that associates each of the network devices to be objects of management with at least one of the device groups; determining, by the computer system, whether to permit a user's operation related to a network device belonging to a device group based on the authority information of each of the device groups stored by the computer system; determining, by the computer system, whether to permit a predetermined operation of a user when receiving from the user a request for the predetermined operation related to a network device belonging to any one of the device groups; and performing processing based on the request for the predetermined operation when the predetermined operation of the user is permitted.

DESCRIPTION OF EMBODIMENTS

Figure 1:
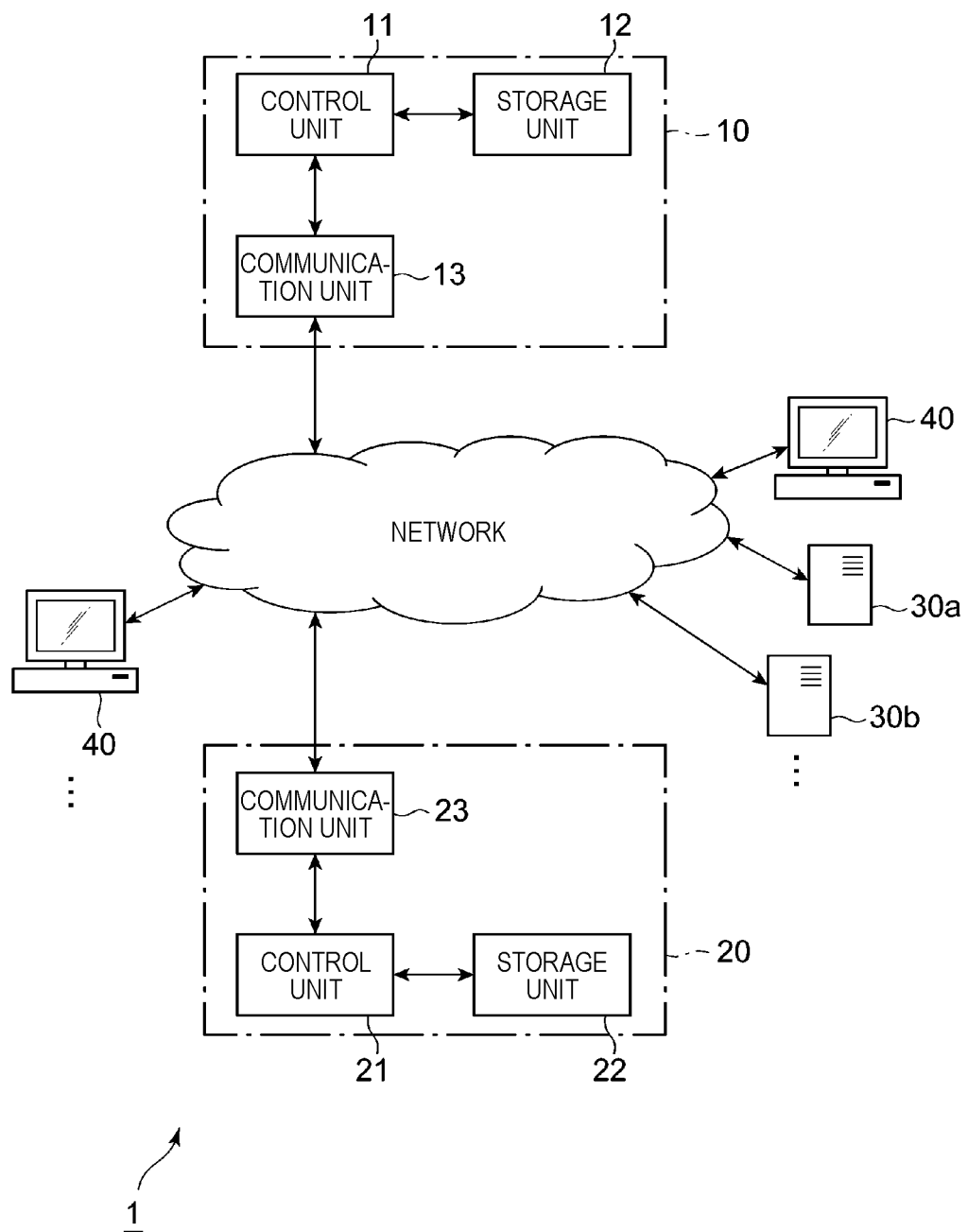
FIG. 1 is a block diagram illustrating the configuration of a device management system according to an embodiment of the present invention.

An embodiment of the present invention will be described with reference to the drawings. As shown in FIG. 1, a device management system 1 according to the embodiment of the present invention is configured to include a device management apparatus 10, a device control apparatus 20, a plurality of network devices 30a, 30b, . . . disposed in a plurality of organizations of clients (client organizations), respectively, and usable by users of the client organizations, and terminal devices 40. The elements of device management system 1 are connected to one another such that communication is possible, and are managed by users belonging to an organization for performing management (a management organization).

Moreover, in the present embodiment, users of the network devices 30 include standard users, administrators, and power users. The standard users monitor the states of the network devices 30 (such as use states, free spaces, and error states) and perform management such as changing the settings. The administrators have management authorities over the network devices 30. The power users assist the administrators, and have management authorities over the network devices 30 equivalent to the management authorities of the administrators.

Also, the users in the management organization further include users having accounts in the device management apparatus 10 in order to remotely manage the network devices 30 (referred to as account owners). In an example of the present embodiment, an account owner may concurrently serve as an administrator, or an account owner may be a standard user.

Also, in the present embodiment, the users who actually perform registration and management of the network devices 30 belong to the management organization, and in general, this management organization may be a professional business operator different from the client organizations, and management organizations may be formed in the client organizations. Hereinafter, in the case where it is required to distinguish between the users in the management organization and the users in the client organizations, the users in the management organization are referred to as management organization users.

The device management apparatus 10 is a server apparatus including a control unit 11, a storage unit 12, and a communication unit 13. The control unit 11 is a program control device that operates according to a program stored in the storage unit 12. If this control unit 11 is accessed from a terminal device 40 for a user, it authenticates the user, and provides a management screen to the terminal device 40 of the authenticated user. As this management screen, for example, a web page can be provided. Also, in the present embodiment, the control unit 11 stores information defining at least one user group as a group of users, and stores information defining device groups as groups of the network devices 30 to be objects of control in association with at least one of the user groups.

Also, the control unit 11 stores authority information of each of the device groups associated with the user groups, and stores association information associating each of the network devices 30 to be objects of control with at least one of the device groups. Further, the control unit 11 determines whether to permit operations of a user related to a network device 30 belonging to a device group on the basis of the authority information of each of the device groups. The detailed processing of the control unit 11 will be described below.

The storage unit 12 includes a memory device or a disk device and stores the program to be executed by the control unit 11, which is a CPU (Central Processing Unit) for example. This program may be stored in a non-transitory computer-readable medium and may be provided or stored in the storage unit 12.

In the present embodiment, the storage unit 12 also operates as a work memory for the control unit 11, such as to store a variety of information according to instructions input from the control unit 11.

The communication unit 13 is a network interface and transmits information to designated destinations in response to instructions input from the control unit 11. Also, the communication unit 13 outputs information received through the network to the control unit 11.

The device control apparatus 20 is a server apparatus including a control unit 21, a storage unit 22, and a communication unit 23. The control unit 21 is a program control device that operates according to a program stored in the storage unit 22. In an example of the present embodiment, the device control apparatus 20 receives a request from a user (a management organization user) for a predetermined operation related to a network device 30 belonging to any one of the device groups defined by the information stored in the device management apparatus 10, and requests the device management apparatus 10 to authenticate the user having made the request. If the user is authenticated, the device control apparatus 20 performs processing based on the user's operation request. This operation of the control unit 21 of the device control apparatus 20 will be described later.

The storage unit 22 includes a memory device or a disk device and stores the program to be executed by the control unit 21. This program may be stored in a non-transitory computer-readable medium and may be provided or stored in the storage unit 22. Further, the storage unit 22 also operates as a work memory for the control unit 21.

The communication unit 23 is a network interface and transmits information to designated destinations, in response to instructions which are input from the control unit 21. Also, the communication unit 23 outputs information received through the network, to the control unit 21.

The network devices 30 are various devices, such as NASs (Network Attached Storages) and access points of a wireless LAN, connected to other devices through the network such that communication is possible.

The terminal devices 40 are general personal computers and are connected to other devices through the network such that communication is possible.

Figure 2:
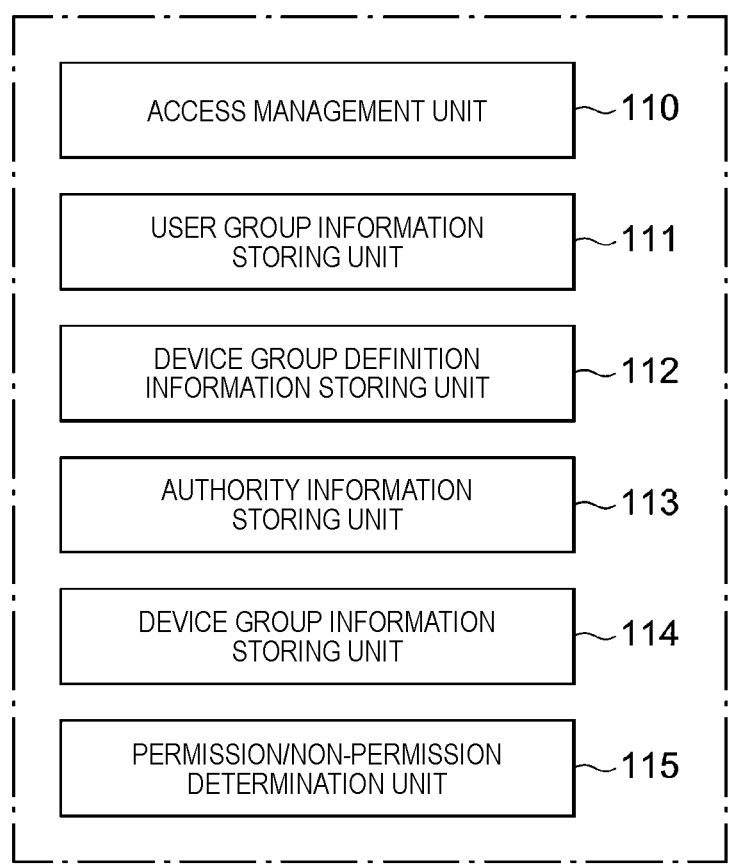
FIG. 2 is a functional block diagram illustrating an example of a control unit of a device management apparatus according to the embodiment of the present invention.

Now, the operations of the control units 11 and 21 of the device management apparatus 10 and the device control apparatus 20 will be described. As shown in FIG. 2, the control unit 11 of the device management apparatus 10 executes the program stored in the storage unit 12 to realize functional components including an access management unit 110, user group information storing unit 111, device group definition information storing unit 112, authority information storing unit 113, device group information storing unit 114, and a permission/non-permission determination unit 115.

The device management apparatus 10 of the present embodiment manages the users in user groups and manages the network devices 30 in device groups. This management is based on the following reason. In the case where a management organization is a business operator, it can be assumed that in that management organization, the device management apparatus 10 is used to manage network devices 30 of a plurality of client organizations. In this case, the number of network devices 30 that are objects of management sometimes increases. Therefore, for example, when the device management apparatus 10 displays the network devices 30 that are objects of management in a management screen for a certain account without distinguishing them, people seeing the display can understand in which network devices 30 failures have occurred, but it is difficult to see to which clients the corresponding network devices 30 belong. Also, it is not easy to refer to the device operation state of each client organization.

In other words, it is desirable that the device management apparatus 10 of the present embodiment should be configured to be able to mechanically determine which network devices belong to which client organization. The management organization can set different account owners for the individual client organizations; however, since this allows for different accounts to be set for the individual client organizations, it is troublesome.

For this reason, the device management apparatus 10 of the present embodiment manages the users in user groups and manages the network devices 30 in device groups.

The access management unit 110 stores access authority information including at least one user access authority information set, which includes user names and passwords associated with each other, in association with user group information (to be described below) identifying any one of the user groups. This access authority information can be registered, changed, and deleted by the administrator of the device management apparatus 10. Registration, change, and deletion may be performed, without any artificial operation of the administrator, by a method such as user registration used in a general web service or the like.

If the device management apparatus 10 is accessed from the terminal device 40 of any one user, it authenticates the user of the corresponding terminal device 40 using the access authority information. If the device management apparatus 10 succeeds in authenticating, it presents to the terminal device 40 of that user the user group information associated with an access authority information, including the user name of the corresponding user. Then, if the user selects one of the users from the presented user group information, the device management apparatus 10 presents to the terminal device 40 of the authenticated user a web page (a management screen) and so on for performing creation, change, and so on of information on other user groups that are sub user groups of the corresponding user group and device groups associated with the corresponding user group information. In this way, the device management apparatus 10 permits the user to perform setting of user groups, setting of device groups, and so on.

Also, if the authentication of the access authority of the user of the terminal device 40 fails, the device management apparatus 10 presents information that the authentication failed to the corresponding terminal device 40 and does not permit the user to perform setting of user groups, setting of device groups, and so on.

In the following description, it is assumed that the user to perform setting of user groups and device groups has succeeded in being authenticated (this authentication is referred to as access authority authentication when it is needed to be distinguished from authentication to be described below).

The user group information storing unit 111 stores in the storage unit 12 information defining at least one user group as a group of users. In the present embodiment, information defining a user group is information including user group information (such as the name of the group) that identifies the user group and user-specific information (such as a user name) that specifies at least one user who is a member of the user group in association with each other. Also, information specifying the management authorities of the users (as standard users, power users, or administrators) may also be associated with the user-specific information.

Also, it can be considered that a management organization as a business operator makes different contracts with client organizations, and client organizations have a variety of confidentiality policies. Therefore, every user in a management organization does not necessarily need to have the same management authority over network devices 30 that are objects of management. For example, there is also the case where it is desired to set different user management authorities over a plurality of network devices 30 belonging to one client organization.

For this reason, in an example of the present embodiment, as described above, a user group is set, and user group information of other user groups that are lower-level user groups (e.g., sub user groups) of the set user group can be further associated with the set user group.

The device group definition information storing unit 112 stores in the storage unit 12 information defining at least one device group as a group of network devices 30 in association with at least one of the user groups. In the present embodiment, information defining device groups includes device group information that identifies device groups and is uniquely issued for the device groups. The device group information is uniquely set for the device groups, respectively. Examples of device group information include hash values of character strings in which user group information and a device group name are connected, and so on.

Further, in an example of the present embodiment, device group information of other device groups can be further associated with the device group as lower-level device groups (e.g., sub device groups) of the corresponding device. Therefore, it becomes possible to flexibly set the relation between the users and the network devices 30, and it becomes possible to perform setting in units of a device group in the case of performing the same setting on a number of network devices 30. Therefore, it is possible to reduce the trouble of setting.

The authority information storing unit 113 records authority information related to individual device groups associated with user groups. In an example of the present embodiment, with respect to each device group, information on the authorities of at least some of users which are members belonging to a user group associated with the corresponding device group is set by the authority information storing unit 113. The content of that setting is stored in the storage unit 12. The authority of a user over a device group includes the authority to change the management information of network devices 30 belonging to the device group and the authority to browse the management information. With respect to the user-specific information of each user who is an object of authority setting, the authority information storing unit 113 records in the storage unit 12 both device group information specifying at least one device group associated with user groups including the corresponding user and information representing the authorities over the corresponding device groups as authority information.

The device group information storing unit 114 stores association information associating each of network devices 30 that are objects of control with at least one of the device groups. Specifically, in the present embodiment, in association with device group information, the device group information storing unit 114 records device-specific information specifying at least one network device 30 as a member of a device group, which is identified by the corresponding device group information. The device-specific information is information uniquely assigned to the individual network devices 30 and need only to be information able to uniquely specify the individual network devices 30, such as the serial numbers of the products or the MAC addresses of the network interfaces of the products.

On the basis of the authority information related to each device group, the permission/non-permission determination unit 115 determines whether to permit a user's operation related to a network device 30 belonging to the corresponding device group. In an example of the present embodiment, the permission/non-permission determination unit 115 receives a determination request representing that it is required to determine whether to permit a user's operation from the device control apparatus 20. This determination request includes user-specific information to be an object of authentication. The permission/non-permission determination unit 115 refers to the authority information stored in the storage unit 12. From the authority information, the permission/non-permission determination unit 115 reads out device group information associated with the user-specific information included in the received determination request and information representing the authorities which the user who is specified by the user-specific information has over the device groups, which are specified by the corresponding device group information. The permission/non-permission determination unit 115 transmits the read information to the device control apparatus 20 which is the transmission source of the determination request.

Specifically, in the case where sub user groups (e.g., lower-level user groups) have been set in association with a certain user group (e.g., an upper-level user group), the user group is managed as a hierarchical structure by the device management apparatus 10.

Also, if sub device groups (lower-level device groups) are set in association with a certain device group (an upper-level device group), the device group is managed as a hierarchical structure by the device management apparatus 10.

For example, a certain user group A is associated with two other user groups B and C as sub user groups, is associated with a power user a and a standard user b (they are set as members of the user group A), and is associated with a device group a.

Correspondingly, the user group B is associated with a power user c and a standard user d (they are set as members of the user group B) and is associated with a device group (3. Similarly, the user group C is associated with a power user e and a standard user f (they are set as members of the user group C) and is associated with a device group y.

The device group y is associated with a sub device group 6.

When this setting has been performed, for example, if the standard user b, who is a member of the user group A, operates a terminal device 40 to access the device control apparatus 20, the device control apparatus 20 authenticates the standard user b. If the device control apparatus 20 authenticates the standard user b, it presents at least at the beginning a list of network devices 30 in a web page presented to the terminal device 40 (a screen for receiving instructions related to the network devices 30). This list is, for example, a list of network devices 30 registered not only in the device group a associated with the user group A including the standard user b as a member but also in the device groups (3, y, and 6 associated with the user groups B and C, which are sub user groups of the user group A. If the standard user b performs an operation for browsing the management information of any one network device 30, whether to permit the corresponding operation is determined according to whether the standard user b has the browsing authority over the device group including the corresponding network device 30.

Meanwhile, for example, if the device control apparatus 20 is accessed by the terminal device 40 of the standard user d, who is a member of the user group B, which is a sub user group of the user group A, the device control apparatus 20 authenticates the standard user d. If the device control apparatus 20 authenticates the standard user d, it presents at least at the beginning a list of network devices 30 in a web page presented to the terminal device 40. This list is, for example, a list of network devices 30 registered in the device group 13 associated with the user group B including the standard user d as a member. If sub user groups are formed as described above, the members of the sub user groups can concentrate on device groups of network devices required to be managed.

If the standard user d performs an operation for browsing the management information of any one network device 30, whether to permit the corresponding operation is determined according to whether the standard user d has the browsing authority over the device group including the corresponding network device 30.

Also, for example, if the device control apparatus 20 is accessed by the terminal device 40 of a standard user f, who is a member of the user group C, which is a sub user group of the user group A, it authenticates the standard user f. If the device control apparatus 20 authenticates the standard user f, it displays at least at the beginning a list of network devices 30 in a web page presented to the terminal device 40. This list is, for example, a list of network devices 30 registered in the device group y associated with the user group C including the standard user f as a member and the device group 6, which is a sub device group of the device group y.

Even in the case, if the standard user f performs an operation for browsing the display of the management information of any one network device 30, whether to permit the corresponding operation is determined according to whether the standard user f has the browsing authority over the device group including the corresponding network device 30.

Also, in this example, when the browsing authority over the device group y is set for a certain user, the user also has the browsing authority over the device group 6, which is a lower-level device group of the device group y such that the authority setting is succeeded from the upper-level device group to the lower-level device group included in the upper-level device group. However, this is an example, and similar to general file systems having hierarchical structures, with respect to the included lower-level device group, a separate different authority may be set. Also, even in this case, it is preferable that the authority setting related to the upper-level device group should be succeeded to the lower-level device group according to a user's desire.

If the permission/non-permission determination unit 115 of the device management apparatus 10 receives a determination request representing that it is required to determine whether to permit an operation of a user, it refers to the authority information stored in the storage unit 12. From the authority information, the permission/non-permission determination unit 115 reads out device group information associated with the user-specific information included in the received determination request and reads out information representing the authorities that the user who is specified by the user-specific information has over the device groups as specified by the corresponding device group information. The permission/non-permission determination unit 115 determines whether there is the device group information of any lower-level device group further associated with the device group information associated with the corresponding user-specific information.

If it is determined that there is at least one lower-level device group, the permission/non-permission determination unit 115 reads out the device group information of each lower-level device group. Also, with respect to each lower-level device group, the permission/non-permission determination unit 115 recursively performs the process of determining whether there are any more lower-level device groups.

Therefore, the permission/non-permission determination unit 115 transmits to the device control apparatus 20 that is the transmission source of the determination request the device group information of all of the device groups hierarchically included in the upper-level device group and information representing the authority that the user who is specified by the user-specific information has over the upper-level device group.

If it becomes possible to hierarchically form user groups and device groups as described above, it becomes possible to easily perform display of lists and setting of authorities.

Figure 3:
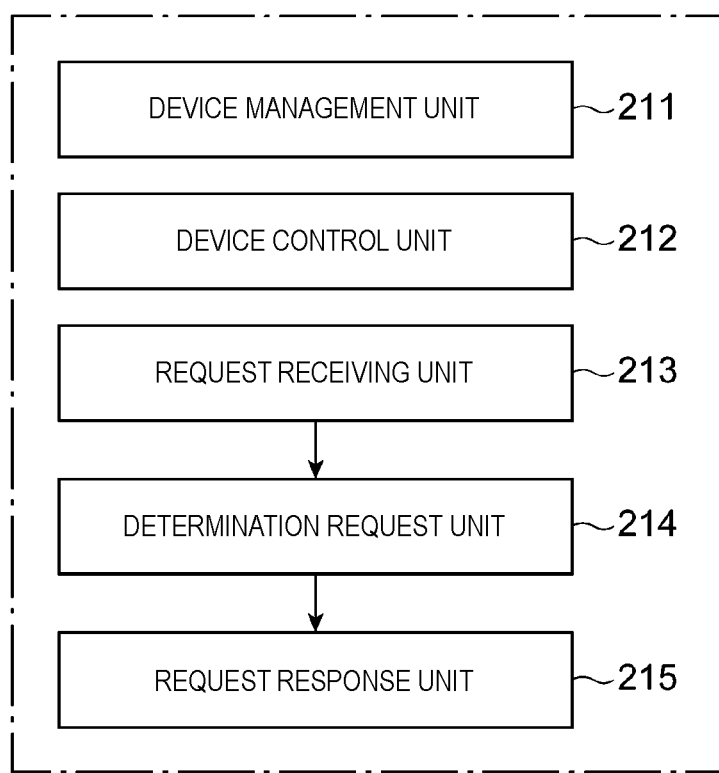
FIG. 3 is a functional block diagram illustrating an example of the control unit of the device management apparatus according to the embodiment of the present invention.

As shown in FIG. 3, the control unit 21 of the device control apparatus 20 executes the program stored in the storage unit 22 to realize functional components including a device management unit 211, a device control unit 212, a request receiving unit 213, a determination request unit 214, and a request response unit 215.

The device management unit 211 receives from the network device 30 device state information (such as operating time, free space, and error information), which is information representing the state of a network device 30 that is an object of management. The device management unit 211 records the device state information associated with device-specific information specifying the corresponding network device 30 such that the device state information is accumulated as a part of the management information.

With respect to each network device 30 that is an object of management, the device control unit 212 records as a part of the management information both device-specific information specifying the corresponding network device 30 and setting information related to the corresponding network device 30. Also, the device control unit 212 transmits the corresponding setting to the corresponding network device 30.

The request receiving unit 213 receives a request for a predetermined operation related to a network device 30 belonging to any one of the device groups that the device management apparatus 10 manages. Examples of the predetermined operation include an operation of setting information for management, an operation of browsing device state information, and so on. The request receiving unit 213 outputs to the determination request unit 214 user-specific information specifying the user having made the request.

The determination request unit 214 transmits to the device management apparatus 10 a determination request including the user-specific information input from the request receiving unit 213. Also, the determination request unit 214 receives information transmitted by the device management apparatus 10 in response to the transmitted determination request. As already described, this information includes information on the authorities over device groups set for the user specified by the user-specific information input from the request receiving unit 213. Specifically, this authority information is information including a set of device group information and authority information.

The request response unit 215 determines whether the request received by the request receiving unit 213 is a request allowed for the user having made the request on the basis of the information received by the determination request unit 214 (hereinafter, referred to as the user authority information). In other words, with respect to the device group information received by the request receiving unit 213 and specifying a device group including the network device 30 that is the object of the operation request, the request response unit 215 determines whether information representing the authority to perform the requested operation is included in the user authority information. If determining that the corresponding information is included (an operation of the user is permitted), the request response unit 215 performs processing based on the user's operation request.

Specifically, if the operation request received by the request receiving unit 213 is a request for browsing the device state information, the request response unit 215 checks whether the user authority information received by the determination request unit 214 includes the authority to browse the management information in association with the device group information specifying the device group including the network device 30 that is the object of the operation request. If the authority to browse the management information is included, the request response unit 215 transmits the device state information received from the network devices 30 belonging to the device group and accumulated, such that the device state information is presented to the user who is the request source (the terminal device 40 that the user is using).

Meanwhile, if the user authority information received by the determination request unit 214 does not include the authority to browse the management information associated with the above-mentioned device group information, the request response unit 215 displays information representing that there is no authority (on the terminal device 40 that the user who is the request source is using) for the corresponding user.

Also, if the operation request received by the request receiving unit 213 is a request for changing the management information (for example, a request for changing the setting information), the request response unit 215 checks whether the user authority information received by the determination request unit 214 includes the authority to change the management information associated with the device group information specifying the device group including the network device 30 that is the object of the operation request. If the authority to change the management information is included, the request response unit 215 transmits an operation screen for changing the management information to the user who is the request source (the terminal device 40 that the corresponding user is using), such that the user performs an operation of changing the management information.

Meanwhile, if the user authority information received by the determination request unit 214 does not include the authority to change the management information in association with the above-mentioned device group information, the request response unit 215 displays information representing that there is no authority (on the terminal device 40 that the user who is the request source is using) for the corresponding user.

As already described, the network device 30 is, for example, an NAS or the like, and transmits at every set timing to the predetermined device management apparatus 10 the device state information, such as the use state together with the device-specific information unique to the network device 30. Also, each network device 30 receives the setting information from the predetermined device management apparatus 10 and operates on the basis of the setting represented by the corresponding setting information. For example, in the case of an NAS, this setting information includes information for setting the configuration of RAID (Redundant Array of Inexpensive Disks), a timing to transmit the device state information, a shut-down operation, and so on.

The terminal device 40 is a computer control device such as a personal computer and is connected between the device management apparatus 10 and the device control apparatus 20 such that communication is possible. A user on the business operator side accesses the device management apparatus 10 by operating a terminal device 40 and performs operations such as defining an organization (setting of an account owner), setting a user group, setting an access authority, and registration of a network device in a device group.

Also, a user on the client side accesses the device control apparatus 20 by operating a terminal device 40 and performs processing such as making a request for an operation such as browsing device state information or changing setting information on terminal device 40.

[Operation]

The embodiment of the present invention has the above-described configuration and operates as follows. In the following example, an example is described with reference to FIG. 4 and FIG. 5 in which a client X having newly introduced NASs as network devices 30$x$, 30$y$, . . . asks a business operator Y to manage for the first time.

In this example, a user on the business operator (Y) side accesses the device management apparatus 10 by operating a terminal device 40 and first performs setting of an account (setting of an account owner). The user may use a web browser to access the device management apparatus 10. In other words, the device management apparatus 10 may perform acceptance of change of the management information of a network device 30 or provision of management information through a Web server.

Figure 4:
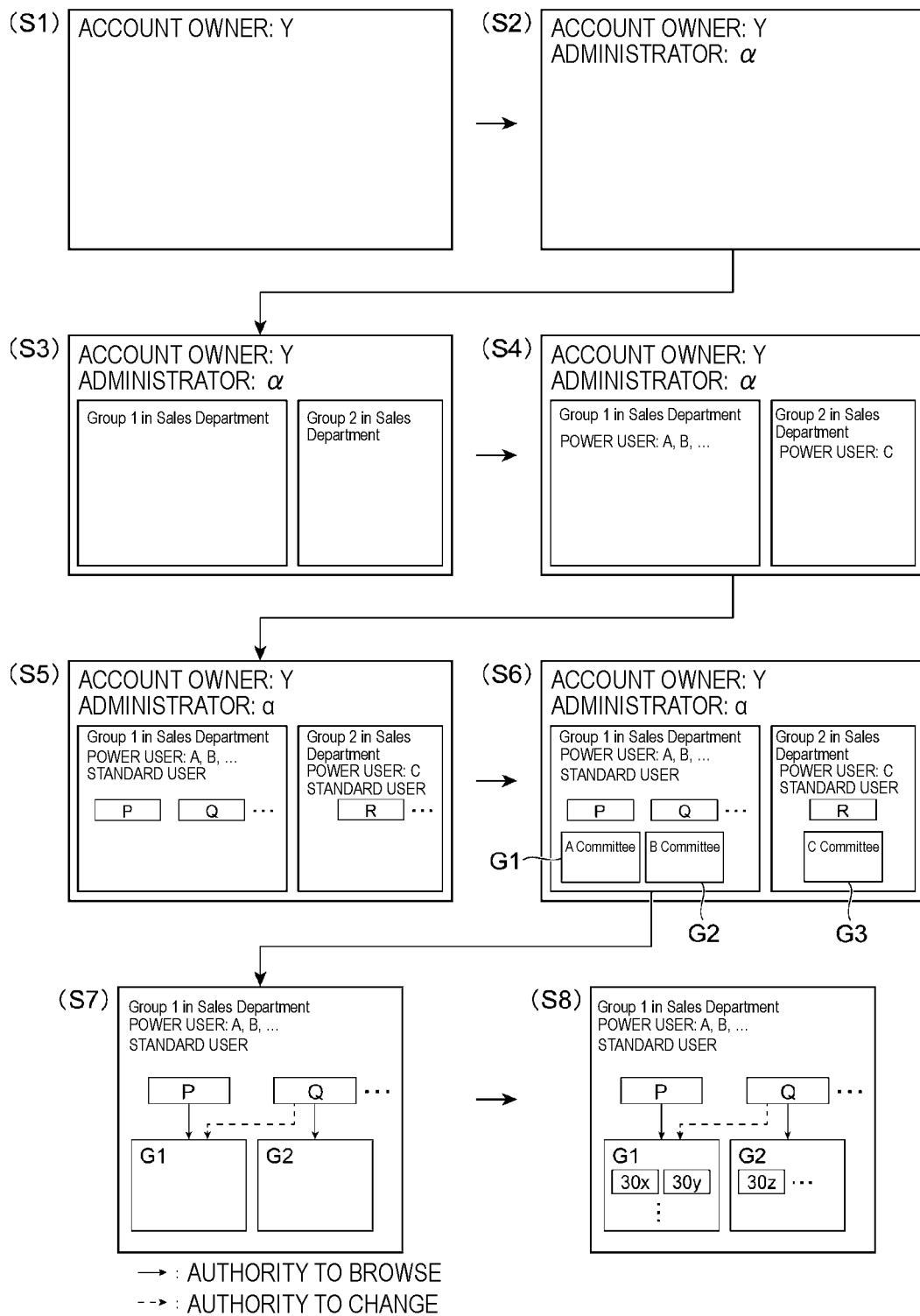
FIG. 4 is a flow chart illustrating an example of the operation of the device management system according to the embodiment of the present invention.

First of all, a user on the business operator (Y) side, which is the management organization, sets himself or herself as the account owner and stores the organization name of the business operator Y in the device management apparatus 10, thereby generating an account (S1 in FIG. 4).

Next, the user having become the account owner registers a user as an administrator in the device management apparatus 10 (S2). Then, this administrator sets a user group in view of the management organization including the administrator (S3). Specifically, by operating a terminal device 40, the administrator transmits the names of user groups (for example, "Group 1 in Sales Department" and "Group 2 in Sales Department") to the device management apparatus 10 and requests the device management apparatus to register the user groups in association with the management organization information stored in STEP S1. The device management apparatus 10 receives the user group names from the terminal device 40 operated by the user on the business operator side and stores the received names as user group information.

Also, with respect to the user groups set in STEP S3, the administrator registers power users in the device management apparatus 10 in association with the user group information. For example, it is assumed that the administrator registers power users A, B, in "Group 1 in Sales Department" and registers a power user C in "Group 2 in Sales Department" (S4). Hereinafter, it is assumed that the administrator or the power users have an authority to perform setting of authorities of standard users to actually perform tasks.

In other words, the administrator or the power users register standard users in the device management apparatus 10 in association with the user group information set in STEP S3 (S5). For example, it is assumed that the administrator or the power users register standard users P, Q, . . . in "Group 1 in Sales Department" and register a standard user R in "Group 2 in Sales Department".

Also, the administrator or the power users set device groups G as placeholders for registering network devices 30 (S6). Specifically, the administrator or the power users transmit to the device management apparatus 10, for each client organization, both the user group information of the user groups set in STEP S3 and the names of the device groups G, while considering the system of the client organization. In this way, the administrator or the power users request the device management apparatus 10 to register the device groups G in association with the user group information.

The device management apparatus 10 receives from the terminal device 40 operated by the user on the business operator side the names of device groups G1 and G2, i.e. "A Committee" and "B Committee", together with the user group information (The user group information related to "Group 1 in Sales Department"). The device management apparatus 10 stores both the names of the individual device groups G and the device group information unique to the individual device groups G in association with the received user group information. Specifically, in the case of considering education boards in a plurality of cities and towns as client organizations, and managing network devices 30 introduced into schools in the cities and the towns which the education boards supervise, it is first considered that a user on the business operator side sets device groups G of each of the education boards in the cities and the towns, which are the client organizations.

Also, the device management apparatus 10 receives the name of a device group G3, i.e., "C Committee", together with other user group information (The user group information related to "Group 2 in Sales Department"). The device management apparatus 10 stores both the names of the individual device groups G and the device group information unique to the individual device groups G in association with the received user group information.

In this stage, the administrator or the power users set authority information with respect to the device groups G1, G2, . . . (hereinafter, referred to collectively as the device groups G) without registering the specific network devices 30x, 30y, . . . . The administrator or the power users request the device management apparatus 10 to set user authority information with respect to each of the device groups G associated with the user groups. Then, in response to the corresponding request, the device management apparatus 10 records the user authority information in association with the device groups G (S7). In FIG. 4, for example, in the subsequent steps, the setting of the configuration of "Group 1 in Sales Department" is shown, but the setting is performed in the same way even with respect to "Group 2 in Sales Department".

As an example, with respect to the standard user P, an authority to browse the management information related to the device group G1 is set. With respect to the user Q, an authority to change the management information related to the device group G1 and an authority to browse them are set In addition, an authority to browse the management information related to the device group G2 is set.

Next, the administrator or the power users register the network devices 30x, 30y, . . . with respect to the device group G1 (S8). As a specific example, the administrator or the power users may transmit to the device management apparatus 10 the device-specific information of the network device 30x to be registered by operating the terminal device 40, such that the device-specific information is stored in association with the device group information stored in STEP S8.

Also, in the example, the administrator or the power users register at least one network device 30 with respect to the device group G2.

The NASs, which are the network devices 30x, 30y, . . . upload device state information at every predetermined timing to the predetermined device control apparatus 20, where the device state information includes the device-specific information specifying the NASs and information representing the states of the NASs (such as information on the sizes of free spaces).

If the device control apparatus 20 receives the device-specific information and the device state information from the network devices 30x, 30y, . . . , it records the device-specific information and the device state information in association with each other such that they are accumulated as parts of the management information.

Also, the device control apparatus 20 is accessed by a user (for example, the standard user P) and authenticates the corresponding user. Then, if succeeding in authenticating the user, the device control apparatus 20 receives from the standard user P a request for an operation related to the information on the network device 30x over which the user has, for example, the browsing authority (for example, a request for browsing the device state information). Then, the device control apparatus 20 transmits to the device management apparatus 10 a request for determining whether to permit the user to operate, the request including the user-specific information of the standard user P.

If the device management apparatus 10 receives from the device control apparatus 20 the request for determining whether to permit the user to operate, it refers to the recorded authority information. From the authority information, the device management apparatus 10 reads out both the device group information associated with the user-specific information of the standard user P and the information representing the authorities that the standard user P specified by the user-specific information included in the received determination request has over the device groups specified by the device group information. The device management apparatus 10 transmits the read information as user authority information to the device control apparatus 20, which is the transmission source of the determination request.

The device control apparatus 20 receives the user authority information from the device management apparatus 10. The device control apparatus 20 determines whether there is the authority to browse the management information in association with the device group information specifying the device group G including the network device 30x that is the object of the operation request.

In this example, the authority has been set for the standard user P to browse the management information with respect to the device group G including the network device 30x. Therefore, the user authority information provided by the device management apparatus 10 includes the authority to browse the management information associated with the device group information specifying the device group G.

Therefore, the device control apparatus 20 determines that the user P has the authority to browse the management information of the network device 30x belonging to the device group G (a browsing operation is permitted) and transmits to the standard user P (the terminal device 40 that the corresponding user is using) the device state information received from the network device 30x and accumulated. Then, the device control apparatus 20 controls the terminal device that the terminal device presents the device state information.

However, with respect to one network device 30 (for example, the above-mentioned network device 30x), the number of management organizations (account owners) including users having the authority to browse or change the management information is not limited to one.

Figure 5:
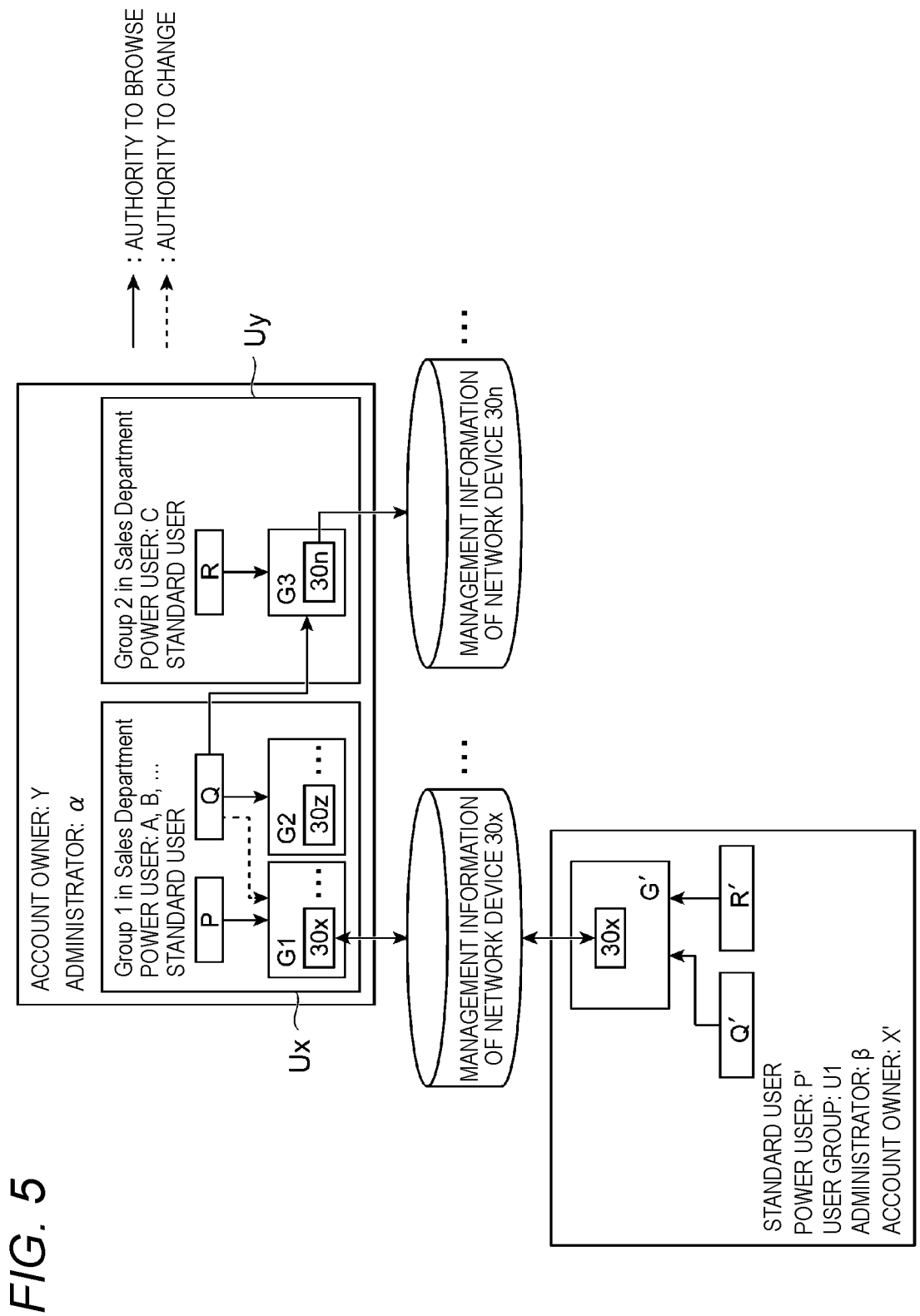
FIG. 5 is an explanatory view illustrating an example of the management state of the device management system according to the embodiment of the present invention.
Figure 6:
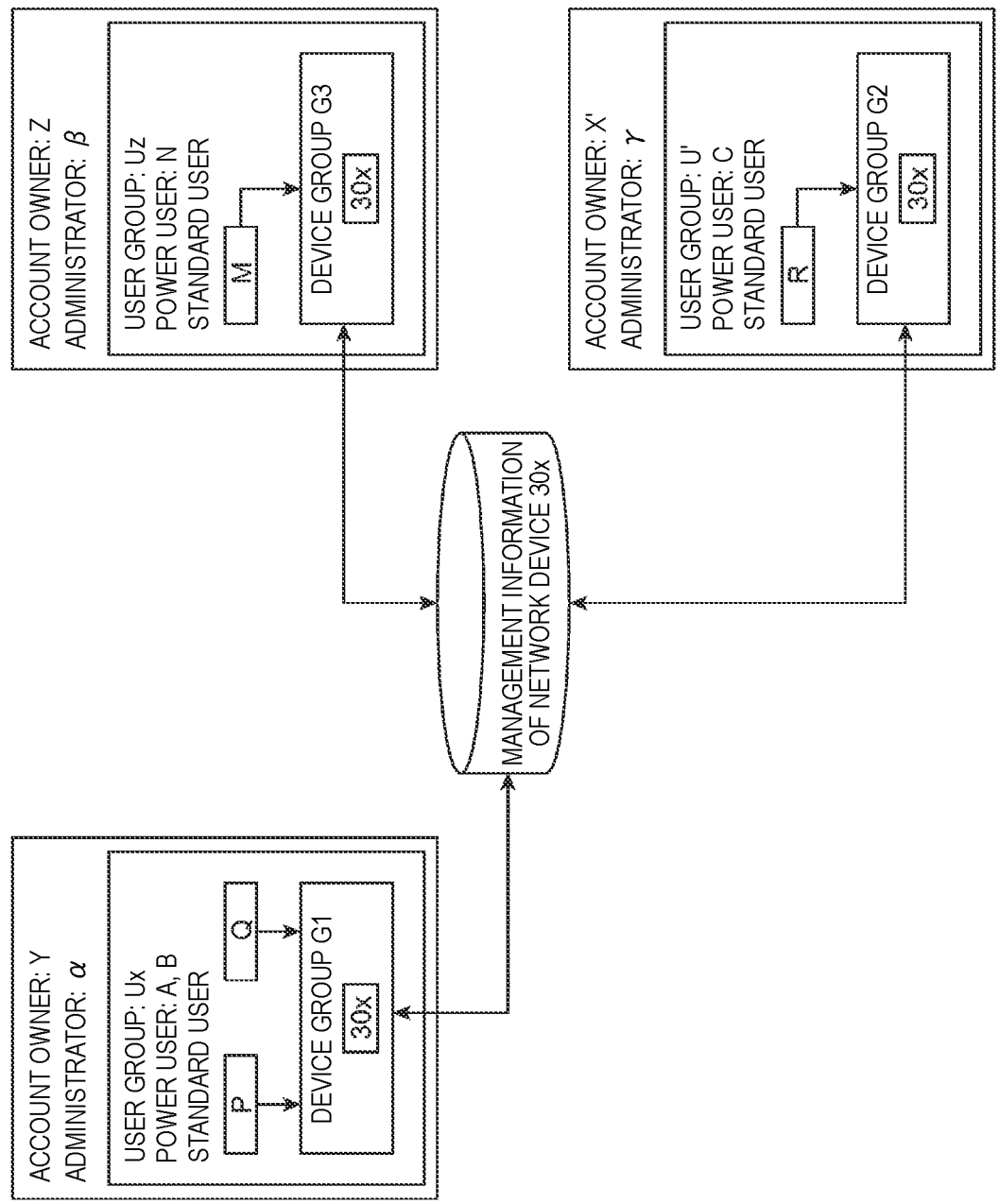
FIG. 6 is an explanatory view illustrating another example of the management situation of the device management system according to the embodiment of the present invention.

For example, as shown in FIG. 5, an account having as an account owner a business operator different from the business operator Y, which is the management organization, or a management organization X' formed in a client organization X, may be set in the device management apparatus 10.

In the example of FIG. 5, in the account of the management organization X', one user group is formed, and a power user P' and two standard users Q' and R' are set. Also, in this user group, a device group G' is set.

Further, in the example of FIG. 5, the network device 30x is associated with the device group G'. This association may be performed in the same way as that in the above-described example.

In this example, if the device control apparatus 20 is accessed by the standard user Q' belonging to the user group set in the account of the management organization X', it authenticates the standard user Q'. Then, if the device control apparatus 20 receives a request for browsing the management information of the network device 30x from the standard user Q', it transmits to the device management apparatus 10 a request for determining whether to permit an operation, the request including the user-specific information of the standard user Q'.

The standard user Q' has the browsing authority over the device group G' including the network device 30x. Therefore, the device control apparatus 20 receives the user authority information representing that state from the device management apparatus 10.

Then, the device control apparatus 20 determines that the standard user Q' has the authority to browse the management information of the network device 30x belonging to the device group G' (a browsing operation is permitted). Therefore, the device control apparatus 20 transmits to the standard user Q' (the terminal device 40 which the corresponding user is using) the device state information received from the network device 30x and accumulated, such that the terminal device presents the device state information.

Also, in the present embodiment, users for which an authority to manage device groups belonging to another user group Uy different from the user group Ux is set may be included in users belonging to a certain user group Ux (e.g., a standard user Q of FIG. 5).

Also, in the present embodiment, one network device 30 may be registered in device groups of account owners of three or more management organizations. In this case, the management information of the corresponding network device 30 can be subjected to browsing and so on by users of the three or more management organizations.

[Other Examples of Network Device Registration Method]

In the above description, in the case of registering a network device 30 with respect to a device group set in the device management apparatus 10, a user transmits the device-specific information of the network device 30 to the device management apparatus 10 to perform registration. However, the present embodiment is not limited thereto.

In the present embodiment, the device management apparatus 10 receives both the device group information of a device group in which a network device 30 is to be registered and a registration key issuing request from a user having a predetermined management authority (for example, the administrator or a power user), where the user is one of the users belonging to a user group associated with the device group in which the network device 30 is to be registered.

In response to the issuing request, the device management apparatus 10 issues a registration key including the device group information and transmits to the terminal device 40 the registration key of the user having made the issuing request.

Also, if the device management apparatus 10 receives the device-specific information with the issued registration key from the network device 30, it records the received device-specific information in association with the device group information included in the received registration key. In this way, the process of registering the network device 30 in the device group is performed.

In this example of the present embodiment, when the registration key is stored in a predetermined storage area, the network device 30 accesses the device management apparatus 10 and transmits the registration key and the device-specific information specifying the network device 30. The access destination URL or the like is included in the registration key; however, it may be included in the firmware of the network device 30. Alternatively, the access destination URL may be recorded in a predetermined storage area of the network device 30 by a user's setting operation.

In this example, the administrator or a power user who wants to register a network device in the device management apparatus 10 accesses the device control apparatus 20 by operating the terminal device 40 of the administrator or the power user. If the power user is authenticated and designates a device group, the device control apparatus 20 may present a list of network devices 30 already registered in the corresponding device group to the terminal device 40 on the user side and present a button for receiving an instruction to register the new network device 30.

If the user clicks the button, the device control apparatus 20 detecting the clicking specifies the device group designated by the previous operation as a registration destination and makes a registration key issuing request to the device management apparatus 10.

In response to this issuing request, the device management apparatus 10 issues a registration key including the device group information of the device group designated as the registration destination and transmits the registration key to the device control apparatus 20. Then, the device control apparatus 20 presents the registration key for the user such that the user can download it.

Then, the administrator or the power user having issued the instruction to register the network device 30 downloads the registration key issued in response to the corresponding request from the device control apparatus 20. Next, the administrator or power user stores the registration key in a non-transitory computer-readable medium, such as a memory card, moves to the installation place of the network device 30, and stores the registration key in the predetermined storage area of the network device 30.

Then, the network device 30 accesses the device management apparatus 10 and transmits the stored registration key and the device-specific information specifying the network device 30. The device management apparatus 10 receives the registration key and the device-specific information from the network device 30 and records the received device-specific information in association with the device group information included in the received registration key.

The device management apparatus 10 transmits the issued registration key to the terminal device 40 of the user, and the user stores the registration key in the network device 30 to be registered. However, the present invention is not limited to this example.

For example, in the above-mentioned example, if the device control apparatus 20 receives designation of a device group from an authenticated user, it may present a list of network devices 30 already registered in the corresponding device group to the terminal device 40 on the user side. The device control apparatus may also display a button for receiving an instruction to register a new network device 30 and an entry field for the network address of the corresponding network device 30 (a network address accessible from the device management apparatus 10 and the device control apparatus 20).

In this example, if the device control apparatus 20 detects that the user has clicked the button without inputting anything in the entry field, it operates in the same way as that in the above-described example. Meanwhile, if detecting that the user has input the network address of the network device 30 desired to be registered, and has clicked the button, the device control apparatus 20 may transmit to the device management apparatus 10 a registration key issuing request including the network address of the network device 30 inputted (the network address accessible from the device management apparatus 10). Then, the device management apparatus 10 may issue a registration key and transmit (upload) the issued registration key to the network address destination. In this case, in response to the uploading of the registration key, the network device 30 accesses the device management apparatus 10 and transmits both the stored registration key and the device-specific information specifying the network device 30.

Also, the device management apparatus 10 may associate one network device 30 with device group information of a plurality of device groups. Specifically, if the device management apparatus 10 receives the registration key and the device-specific information specifying the network device 30, it records the device-specific information in association with the device group information included in the registration key. Even though the device-specific information has been already associated with device group information different from the device group information included in the received registration key (the same network device 30 is already a member of another device group), the device management apparatus 10 records the device-specific information in association with the device group information included in the registration key. In this way, the network device 30 can be associated with a plurality of device groups different from one another.

In this example, as already described, it is desirable for a case where the client organization (X) side asks the business operator Y which is a management organization to manage a network device registers the network device 30 to be managed by the business operator Y. A device group in which the network device 30 can be registered is a device group included in an account having the management organization X' formed in the client organization X as an account owner.

In other words, in this case, after the management organization (X') side in the client organization X having asked for management by business operator issues a registration key including the device group information identifying the device group G in the account, it can transmit the registration key to a member of the management organization of the business operator Y by mail or the like, without moving to the installation place of the network device 30, in order to ask for registration.

Specifically, in this case, the member of the management organization of the business operator Y receiving the registration key may access the device control apparatus 20 by operating the terminal device 40 and specify the network device 30 that is the object (network device 30 is a member of any one device group in the account of the management organization of the business operator Y, for example, the device group G1). Next, the corresponding member may make the device management apparatus 10 transmit the received registration key together with the device group information of the specified network device 30 to the device management apparatus 10.

As already described, the device management apparatus 10 records the device group information of the network device 30 in association with the device group information of the device group G.

In this way, the network device 30 is registered not only in the device group G1 of the account of the management organization of the business operator Y but also in the device group G' of the account of the management organization X' formed in the client organization X.

Therefore, the client organization can freely form user groups and device groups according to the corresponding organization and can leave tasks such as registration of network devices to the business operator. Also, in the case where the business operator side is asked for a task of registering network devices from the outside, the business operator side can establish a device management system based on the configurations of user groups and device groups that the client wants without being conscious of, for example, the structure of the client organization that asked for registration, and so on. In other words, for both sides, tasks such as setting becomes easy.

[Other Example of Apparatus Configuration]

The device management apparatus 10 and the device control apparatus 20 may be configured as a single apparatus, not as separate apparatuses. In this case, if the single apparatus receives a request from a user for a predetermined operation related to a network device 30 belonging to any one of the device groups by functioning as the device control apparatus 20, it performs authentication of the corresponding user by functioning as the device management apparatus 10. If the corresponding user is authenticated, the single apparatus performs processing based on the user's operation request by performing an operation as the device control apparatus 20.

[Other Types of Network Devices]

Also, although NASs have been described as examples of the network devices 30, as already described, the network devices 30 may be wireless LAN access points. In this case, setting information transmitted from the device management apparatus 10 to the network devices 30 is, for example, the setting of a frequency band to be used, the setting of transmission output intensity, and so on. Also, besides them, a variety of information such as the setting of a timing to upload firmware and the setting of a backup schedule may be included in the setting information.

A device management system related to an aspect of the present invention for solving the problem of the example according to the related art includes a device management apparatus. The device management apparatus includes one or more memories (the storage unit 12 in the embodiment is an example of a memory), and one or more processors (the control unit 11 in the embodiment is an example of a processor). The one or more processors are configured to: store in the one or more memories user group information that defines at least one user group, each user group being a group of one or more users; store in the one or more memories device group definition information that defines at least one device group in association with at least one user group, each device group being a group of one or more network devices; store in the one or more memories authority information of each device group associated with at least one user group; store in the one or more memories association information that associates each of the network devices to be objects of management with at least one of the device groups; and determine whether to permit a user operation related to a network device belonging to a device group based on the authority information of each of the device groups stored in the one or more memories.

According to this device management system, it is possible to manage users and devices in groups, and it is possible to support a management service corresponding to a plurality of clients and a plurality of network devices.

Also, the one or more processors are configured to store in the one or more memories authority information for each device group, the authority information including information identifying authority to perform operations on one or more network devices within each device group for one or more users within the one or more user groups associated with each device group.

In this case, management of authority information corresponding to a plurality of clients or a plurality of network devices can be supported.

Also, the user groups may include a first user group that includes one or more sub user groups that include at least one or more users belonging to other user groups. In this case, it is possible to flexibly manage user groups.

Also, the device groups may include a first device group that includes one or more sub device groups that include at least one or more network devices belonging to other device groups. In this case, it is possible to flexibly manage device groups.

Also, the one or more processors may be configured to issue a registration key that includes information specifying at least one device group defined by the device group definition information stored in the one or more memories, and perform registration processing to register the registration key in association with the device group specified in the registration key. In this case, the registration tasks are simplified by the registration key.

Also, the one or more processors may be configured to receive the issued registration key and the information specifying the network device and perform the registration processing of registering the network device specified by the definition information in association with the device group specified by the information included in the received registration key.

Also, the one or more processors may be configured to receive the issued registration key and the information specifying the network device from the network device. In this case, the registration tasks are simplified.

Also, wherein the one or more processors may be configured to: perform user authentication; and receive a request for a predetermined operation related to a network device belonging to any one of the device groups, from an authenticated user, and perform processing based on the user's operation request.

Also, a device management method related to another aspect is executed by a computer system including at least one computer. The device management method includes: storing, by the computer system, user group information that defines at least one user group, each user group being a group of one or more users; storing, by the computer system, device group definition information that defines at least one device group in association with at least one user group, each device group being a group of one or more network devices; storing, by the computer system, authority information of each device group associated with at least one user group; storing, by the computer system, association information that associates each of the network devices to be objects of management with at least one of the device groups; determining, by the computer system, whether to permit a user's operation related to a network device belonging to a device group based on the authority information of each of the device groups stored by the computer system; determining, by the computer system, whether to permit a predetermined operation when receiving from the user a request for the predetermined operation related to a network device belonging to any one of the device groups; and performing processing based on the request for the predetermined operation when the predetermined operation of the user is permitted.

Also, a non-transitory, computer-readable medium related to another aspect stores instructions that, when executed by a computer system including a display screen and circuitry, control the computer system to implement a device management method. The device management method includes: storing, by the computer system, user group information that defines at least one user group, each user group being a group of one or more users; storing, by the computer system, device group definition information that defines at least one device group in association with at least one user group, each device group being a group of one or more network devices; storing, by the computer system, authority information of each device group associated with at least one user group; storing, by the computer system, association information that associates each of the network devices to be objects of management with at least one of the device groups; determining, by the computer system, whether to permit a user's operation related to a network device belonging to a device group based on the authority information of each of the device groups stored by the computer system; determining, by the computer system, whether to permit a predetermined operation of a user when receiving from the user a request for the predetermined operation related to a network device belonging to any one of the device groups; and performing processing based on the request for the predetermined operation when the predetermined operation of the user is permitted.

According to these aspects, it is possible to manage users and devices in groups, and it is possible to support a management service corresponding to a plurality of clients and a plurality of network devices.

According to the present invention, it is possible to manage users and devices in groups, and it is possible to support a management service corresponding to a plurality of clients and a plurality of network devices.

What is claimed is:

1. A device management system comprising a device management apparatus, wherein
    the device management apparatus comprises:
        one or more memories; and
        one or more processors,
    wherein the one or more processors are configured to:
        store in the one or more memories user group information that defines at least one user group, each user group being a group of one or more users;
        store in the one or more memories device group definition information that defines at least one device group in association with at least one user group, each device group being a group of one or more network devices;
        store in the one or more memories authority information of each device group associated with at least one user group;
        store in the one or more memories association information that associates each of the network devices with at least one of the device groups;
        determine whether to permit a user operation related to a network device belonging to a particular device group based on the authority information of each of the device groups stored in the one or more memories;
        issue a registration key that includes information specifying a particular device group of the at least one device group defined by the device group definition information stored in the one or more memories; and
        register the registration key in association with the particular device group.

2. The device management system according to claim 1, wherein
    the authority information includes information identifying authority to perform operations on one or more network devices within each device group for one or more users within the one or more user groups associated with each device group.

3. The device management system according to claim 1, wherein
    a first user group includes one or more sub user groups that include one or more users belonging to the first user group.

4. The device management system according to claim 1, wherein
a first device group includes one or more of the plurality of sub device groups that include one or more network devices belonging to the first device group.

5. The device management system according to claim 1, wherein
the one or more processors are configured to:
transmit the issued registration key;
receive, from a particular network device to be registered, the issued registration key; and
register the particular network device in association with the particular device group specified by the information included in the received registration key.

6. The device management system according to claim 5, wherein
the one or more processors are configured to:
issue the registration key in response to a request from a user belonging to the particular device group, the request being transmitted from a terminal device; and
transmit the issued registration key to the terminal device.

7. The device management system according to claim 1, wherein the one or more processors are configured to:
perform user authentication;
receive from an authenticated user a request for a predetermined operation related to a network device belonging to any one of the device groups; and
perform processing based on the user's operation request.

8. The device management system according to claim 1, further comprising a device control apparatus,
wherein the device control apparatus is configured to:
receive, from a user, a request for a predetermined operation related to a network device belonging to any one of the device groups;
request the device management apparatus to determine whether to permit an operation of the user; and
perform processing based on the user's operation request when the operation of the user is permitted.

9. The device management system according to claim 1, wherein the one or more processors are further configured to:
check whether a particular user of the one or more users has authority to browse the accumulated device state information based on the authority information.

10. The device management system according to claim 1, wherein the at least one device group comprises a plurality of sub device groups managed as a hierarchical structure.

11. The device management system according to claim 1, wherein
the one or more processors are configured to:
receive device state information at a set timing from each of the one or more network devices and storing the device state information in the one or more memories, such that the device state information is accumulated as device management information.

12. The device management system according to claim 1, wherein
the one or more processors are configured to:
issue the registration key in response to a request from a user transmitted from a terminal device.

13. A device management method which is executed by a computer system including at least one computer, the device management method comprising:
storing, by the computer system, user group information that defines at least one user group, each user group being a group of one or more users;
storing, by the computer system, device group definition information that defines at least one device group in association with at least one user group; each device group being a group of one or more network devices;
storing, by the computer system, authority information of each device group associated with at least one user group;
storing, by the computer system, association information that associates each of the network devices with at least one of the device groups;
determining, by the computer system, whether to permit a user's operation related to a network device belonging to a particular device group based on the authority information of each of the device groups stored by the computer system;
determining, by the computer system, whether to permit a predetermined operation when receiving from the user a request for the predetermined operation related to a network device belonging to any one of the device groups;
performing processing based on the request for the predetermined operation when the predetermined operation of the user is permitted;
issuing a registration key that includes information specifying a particular device group of the at least one device group defined by the device group definition information stored in the one or more memories; and
registering the registration key in association with the particular device group.

14. The device management method of claim 13, wherein the authority information includes information identifying authority to perform operations on one or more network devices within each device group for one or more users within the one or more user groups associated with each device group.

15. The device management method according to claim 13, wherein a first user group includes one or more sub user groups that include at least one or more users belonging to the first user group.

16. The device management method according to claim 13, wherein a first device group includes one or more of the plurality of sub device groups that include at least one or more network devices belonging to the first device group.

17. The device management method according to claim 13, wherein the method further comprises:
transmitting the issued registration key;
receiving, by the computer system and from a particular network device to be registered, the issued registration key; and
performing, by the computer system, registration of the particular network device in association with the particular device group specified by the information included in the received registration key.

18. The device management method according to claim 13, wherein the method further comprises:
performing, by the computer system, user authentication;
receiving, by the computer system, from an authenticated user a request for a predetermined operation related to a network device belonging to any one of the device groups; and
performing, by the computer system, processing based on the user's operation request.

19. The device management method according to claim 13, wherein the method further comprises:
- receiving, by the computer system, from a user, a request for a predetermined operation related to a network device belonging to any one of the device groups;
- requesting, by the computer system, the device management apparatus to determine whether to permit an operation of the user; and
- performing, by the computer system, processing based on the user's operation request when the operation of the user is permitted.

20. A non-transitory, computer-readable medium storing instructions that; when executed by a computer system comprising a display screen and circuitry, control the computer system to implement a device management method comprising:
- storing, by the computer system, user group information that defines at least one user group, each user group being a group of one or more users;
- storing, by the computer system, device group definition information that defines at least one device group in association with at least one user group, each device group being a group of one or more network devices;
- storing, by the computer system, authority information of each device group associated with at least one user group;
- storing, by the computer system, association information that associates each of the network devices with at least one of the device groups;
- determining, by the computer system, whether to permit a user's operation related to a network device belonging to a particular device group based on the authority information of each of the device groups stored by the computer system;
- determining, by the computer system, whether to permit a predetermined operation of a user when receiving from the user a request for the predetermined operation related to a network device belonging to any one of the device groups;
- performing processing based on the request for the predetermined operation when the predetermined operation of the user is permitted;
- issuing a registration key that includes information specifying a particular device group of the at least one device group defined by the device group definition information stored in the one or more memories; and
- registering the registration key in association with the particular device group.

21. The non-transitory, computer-readable medium of claim 20, wherein the authority information includes information identifying authority to perform operations on one or more network devices within each device group for one or more users within the one or more user groups associated with each device group.

* * * * *